(12) United States Patent
Maguire

(10) Patent No.: US 8,113,089 B2
(45) Date of Patent: Feb. 14, 2012

(54) ENGINE STARTING APPARATUS

(75) Inventor: Joel M. Maguire, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 499 days.

(21) Appl. No.: 12/424,616

(22) Filed: Apr. 16, 2009

(65) Prior Publication Data

US 2010/0263480 A1  Oct. 21, 2010

(51) Int. Cl.
  F16H 47/00 (2006.01)
  F02N 15/02 (2006.01)
  F16D 33/00 (2006.01)
  F02N 11/00 (2006.01)
(52) U.S. Cl. ..... 74/730.1; 74/7 C; 192/3.21; 123/179.25
(58) Field of Classification Search ................ 74/6, 7 R, 74/7 C, 7 E, 8, 730.1, 732.1; 123/179.1–184.1; 192/3.21–3.34; 475/5; 477/5, 6
See application file for complete search history.

(56) References Cited

U.S. PATENT DOCUMENTS

| 2,101,606 | A | * | 12/1937 | Ayres | 74/7 R |
| 4,410,071 | A | * | 10/1983 | Osterman | 477/4 |
| 4,667,788 | A | | 5/1987 | Johnston et al. | |
| 5,285,111 | A | * | 2/1994 | Sherman | 290/4 C |
| 5,398,562 | A | | 3/1995 | Muchmore | |
| 6,254,507 | B1 | | 7/2001 | Downs | |
| 7,389,707 | B2 | | 6/2008 | Murase et al. | |

* cited by examiner

*Primary Examiner* — David D Le
*Assistant Examiner* — Michael Gonzalez
(74) *Attorney, Agent, or Firm* — Quinn Law Group, PLLC

(57) ABSTRACT

An engine starting apparatus is provided that has a constantly engaged starter pinion and a one-way clutch lubricated with transmission fluid, without modification to the engine and without adding axial length to the transmission. Specifically, a starting apparatus for cranking an engine crankshaft using a starter motor is provided for an engine that is operatively connected to a transmission through a torque converter.

12 Claims, 3 Drawing Sheets

US 8,113,089 B2

ENGINE STARTING APPARATUS

TECHNICAL FIELD

The invention relates generally to a transmission with a starting apparatus for an engine, and specifically to a starting assembly for an engine connected to a transmission through a torque converter.

BACKGROUND OF THE INVENTION

Traditional engine starting mechanisms use an electric motor to drive the crankshaft to start the motor. The electric motor has a pinion gear driven by an output shaft of the motor. A ring gear is connected with a flex plate mounted to the engine crankshaft. When operating conditions warrant, the pinion gear is moved into meshing engagement with the ring gear so that the motor will drive the crankshaft. An actuator is typically used to move the pinion gear. The ring gear, and hence the engine crankshaft must be stationary, or moving at the same speed as the pinion gear, in order to bring the pinion gear into meshing engagement with the ring gear. Actuation of the pinion gear adds a time delay to starting of the engine, slowing response time. Additionally, if the gears are not synchronous when meshed, damage to the gears and/or noise will result.

Some recent starting mechanisms have utilized a constantly meshing pinion gear and ring gear, with a one-way clutch that engages to transmit torque from the starting motor to drive the crankshaft under some conditions, and overruns after the engine is started. The one-way clutch requires lubrication. Packaging and lubrication requirements of the one-way clutch have required modifications to the engine and resulted in added axial length to the powertrain.

SUMMARY OF THE INVENTION

An engine starting apparatus is provided that has a constantly engaged starter pinion and a one-way clutch lubricated with transmission fluid, without modification to the engine and without adding axial length to the transmission. Specifically, a starting apparatus for cranking an engine crankshaft using a starter motor is provided for an engine that is operatively connected to a transmission through a torque converter. The torque converter has a torque converter cover connected for rotation with the crankshaft, for covering a pump portion of the torque converter, with a torque converter hub member connected to the torque converter cover for driving a transmission pump. The starting apparatus includes a one-way clutch having a first portion continuously operatively connected with the starter motor, and a second portion continuously connected for rotation with the torque converter hub member. The torque converter hub member is configured to permit fluid from the transmission to lubricate the one-way clutch. The one-way clutch is configured to operatively engage the starter motor and torque converter cover for common rotation if the second portion is not rotating faster than the first portion so that the starter motor drives the crankshaft, and configured to overrun if the second portion is rotating faster than the first portion when the engine is started. A sealing apparatus is provided to maintain the transmission fluid at the one-way clutch.

More specifically, a starting apparatus for cranking an engine crankshaft using a starter motor, is provided that includes a pinion gear connected for rotation with the starter motor, and a torque converter cover operatively connected for rotation with the engine crankshaft. A shell member partially surrounds the torque converter cover. A ring gear is connected to the shell member and is in constant meshing relationship with the pinion gear such that the shell member is rotatably driven by the starter motor. A one-way clutch has a first portion connected for rotation with the shell member and a second portion connected for rotation with the torque converter cover. The one-way clutch operatively engages the torque converter cover and the shell member for common rotation if the torque converter cover is not rotating faster than the shell member so that the starter motor drives the crankshaft, and is configured to overrun if the torque converter cover is rotating faster than the shell member when the engine is started.

Because the pinion gear and the ring gear are constantly engaged, starting of the engine can occur in response to change of mind starts, i.e., when a vehicle operator brakes, thus discontinuing fuel to the engine, and then quickly presses on the accelerator before the engine crankshaft has slowed. Starting assemblies that require the pinion to be actuated into engagement with a ring gear cannot respond to change of mind starts as quickly, as the crankshaft must first have slowed.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
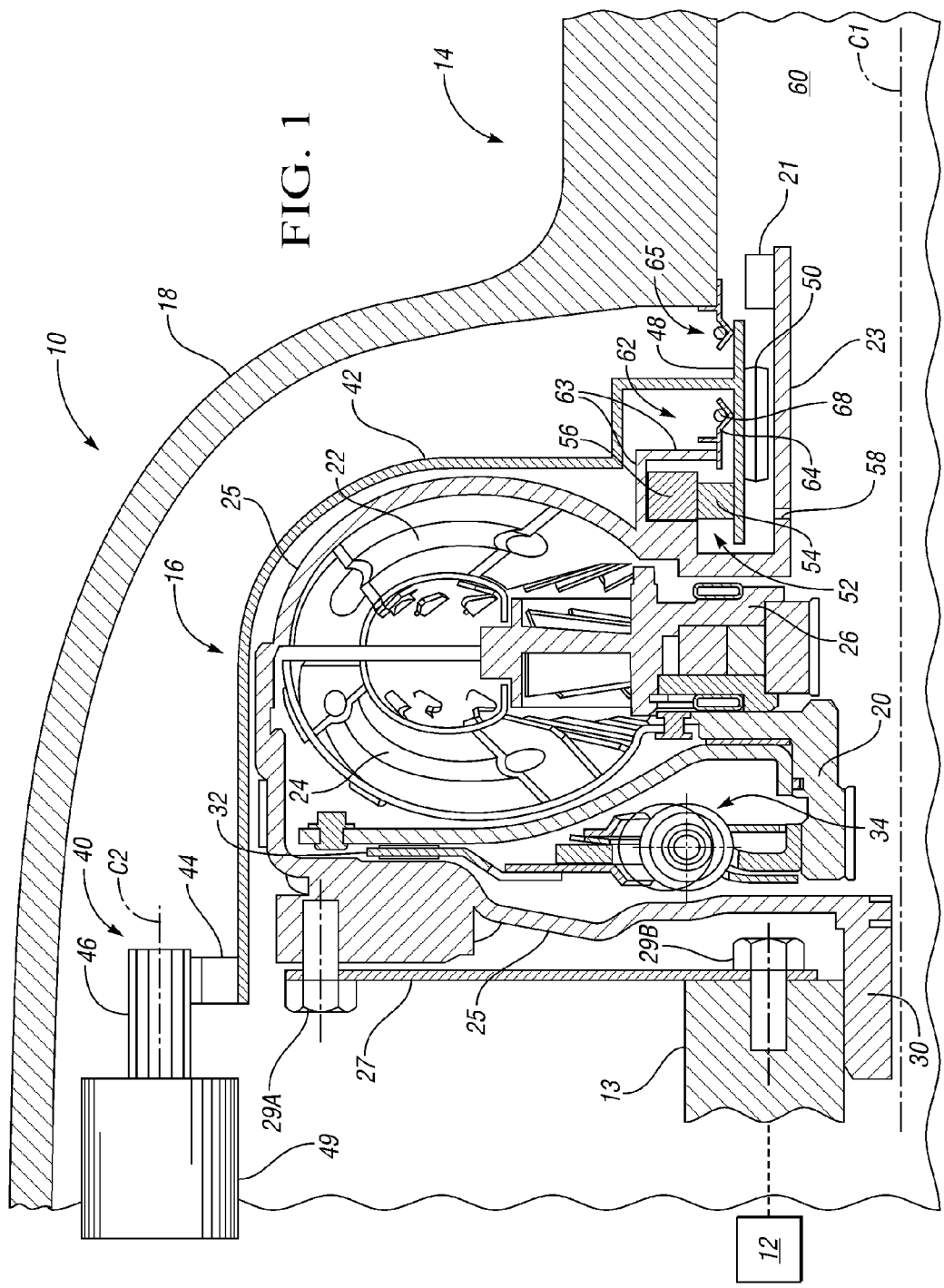
FIG. 1 is a schematic fragmentary, partially cross-sectional view of a powertrain with an engine connected to a transmission via a torque converter, with an engine starting apparatus for cranking a crankshaft of the engine.

Referring to FIG. 1, a portion of a powertrain 10 is shown with an engine 12 with a crankshaft 13, and a transmission 14 operatively connected to provide driving traction to vehicle wheels, not shown. The engine 12 is operatively connected to the transmission 14 through a torque converter 16. The transmission 14 has a transmission casing 18, which may be one piece or several connected pieces, and which also surrounds the torque converter 16. The transmission 14 includes a gearing arrangement and selectively engagable clutches and brakes in order to provide several speed ratios between a transmission input member 20 and an output member (not shown) connected with vehicle wheels. The transmission 14 may be of any type, including a planetary transmission, a lay shaft transmission, a hybrid electro-mechanical transmission. Rotating components of the engine 12, including the crankshaft 13, and of the torque converter 16 and transmission 14 rotate about a center axis C1. Only a portion of the powertrain 10 is shown above the axis C1 in FIG. 1, with a remaining portion generally symmetrical below the axis C1 not shown.

The torque converter 16 includes an impeller or pump portion 22, a turbine portion 24 and a stator portion 26, as is known. A torque converter cover 25 forms a portion of the pump portion 22 and is secured to a flex plate 27 via bolt 29A.

The flex plate 27 is in turn secured for rotation with the engine crankshaft 13 via a bolt 29B. A piloting hub 30 extends from the torque converter cover 25, allowing the crankshaft 13 to be used for piloting the torque converter cover 25 into position when assembling the powertrain 10. A pump 21 is rotatable driven with the torque converter cover 25 via a torque converter hub member 23 extending axially from the torque converter cover 25.

The torque converter 16 forms a fluid coupling between the pump portion 22 and the turbine portion 24, permitting slippage between the engine crankshaft 13 and the transmission input 20 to effectively dampen torsional vibrations and permit torque multiplication during the torque converter phase. A torque converter clutch 32 is also provided to bypass the fluid coupling and directly connect the crankshaft 13 with the input member 20. A torsional damper 34 dampens engine vibrations when the torque converter clutch 32 is engaged. The operation and structure of an automotive engine, a torque converter, and a transmission is well known to those skilled in the art, such that further description of their operation and structure is not necessary.

An engine starting apparatus 40 is integrated with the torque converter 16 to allow cranking of the crankshaft 13 to start the engine 12 with a reduced noise and quicker starting time than known systems. The engine starting apparatus 40 includes a shell member 42 configured to partially wrap around the torque converter cover 25. The shell member 42 has a ring gear 44 mounted to a radially outer surface. The ring gear 44 is positioned to be constantly meshing with a pinion gear 46 that is driven by a starter motor 49 and rotates about an axis C2. That is, the pinion gear 46 and the ring gear 44 are fixed axially, and remain meshing at all times, whether stationary or rotating. The shell member 42 includes a second hub member 48 that extends axially and is piloted off of the torque converter hub member 23 with a bushing 50 therebetween.

The engine starting apparatus 40 further includes a one-way clutch 52 that is operable to engage the shell member 42 for rotation with the torque converter cover 25 under certain operating conditions and to overrun under other operating conditions, as further described below. The one-way clutch 52 has a first portion 54 that includes an inner race, and a second portion 56 that includes an outer race. The first portion 54 is secured for rotation with the second hub member 48 and shell member 42. The second portion 56 is secured for rotation with the torque converter cover 25, and thereby with the crankshaft 13 and the torque converter hub member 23. The one-way clutch 52 is shown in more detail in FIG. 2 as a roller-type one-way clutch; however, any of many known types of one-way clutches may be used that can be configured to engage when one portion (here the outer race or second portion 56) rotates faster than the other portion (here the inner race or first portion 54) and to overrun otherwise. For example, a sprag-type one-way clutch, such as the alternative one-way clutch 52A of FIG. 3 may be used. A mechanical diode-type one-way clutch may also be used.

The torque converter hub member 23 has an aperture 58 or a series of circumferentially-spaced apertures that permit transmission fluid in the transmission cavity 60 into fluid communication with the one-way clutch 52 in order to provide lubrication of the components of the clutch 52. Because the one-way clutch 52 is lubricated through the torque converter hub 23 with existing transmission fluid pressurized by the pump 21, additional components or machining operations are minimized.

A sealing apparatus 62 is secured to the torque converter cover 25, specifically to an extension 63 thereof that packages the second portion 56 of the one way clutch 52. The sealing apparatus 62 includes an elastomeric seal member 64 and a retaining ring 68 biasing the seal member 64 to the second hub member 48 to thereby contain fluid provided from the transmission cavity 60 through the aperture 58 at the one-way clutch 52, preventing the fluid from entering a space formed between the torque converter cover 25 and the shell member 42. A similar sealing apparatus 65 prevents transmission fluid leakage between the second hub member 48 and the casing 18.

Figure 2:
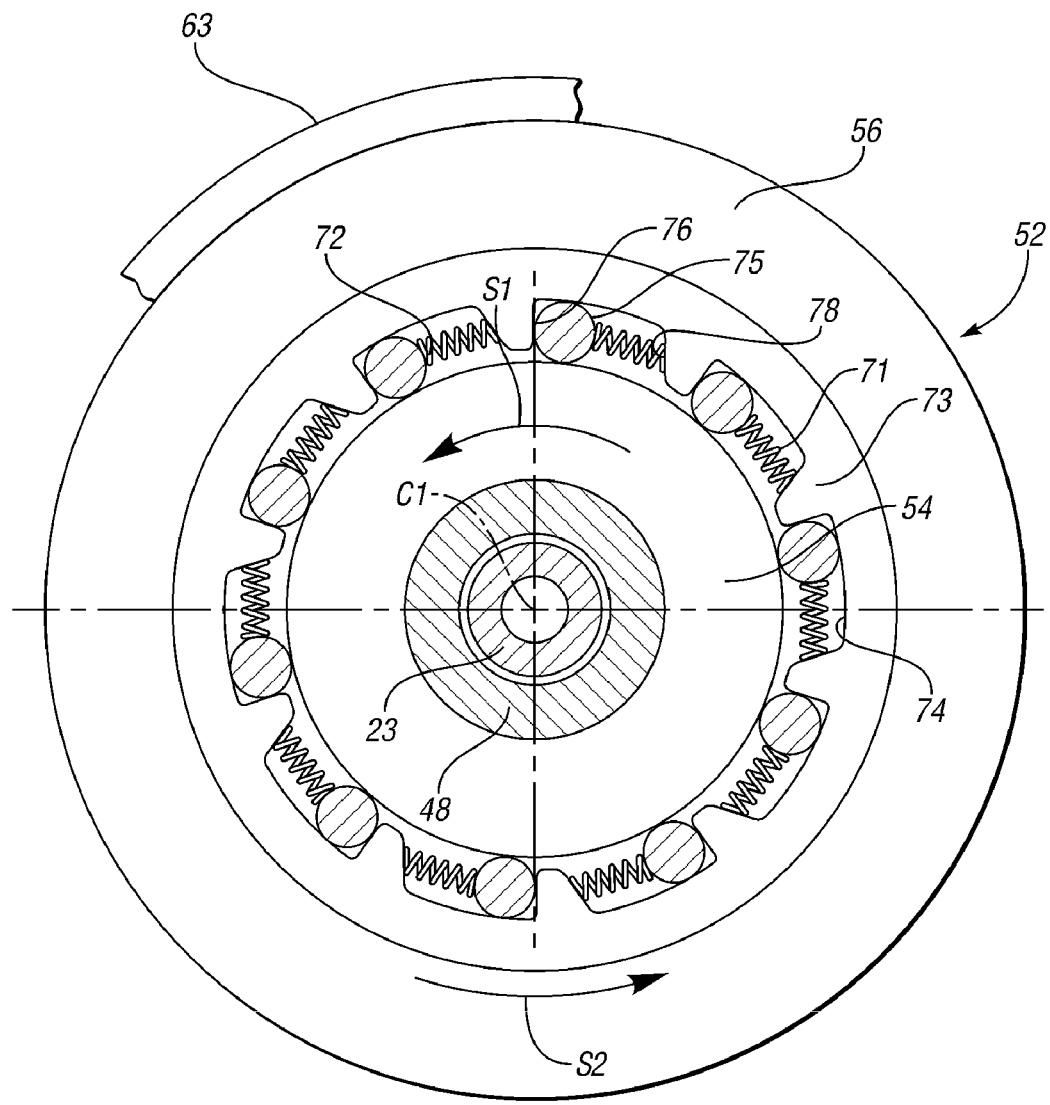
FIG. 2 is a schematic cross-sectional illustration of a one-way clutch included in the engine starting apparatus of FIG. 1.

Referring to FIG. 2, the one-way clutch 52 is shown in greater detail. The first portion 54 or inner race is shown secured for rotation with the second hub member 48. The torque converter hub member 23 is concentric with the second hub member 48, but rotates independently therefrom, and is separated by the bushing 50 of FIG. 1 (not shown in FIG. 2). Rather, the torque converter hub member 23 rotates with the second portion 56 or outer race as is apparent in FIG. 1. The second portion 56 is secured for rotation with the extension 63 (shown only in fragmentary form) of the torque converter cover 25 by pins, fasteners, welding, press-fitting, or otherwise. Alternatively, the second portion 56 may be integrally formed with the torque converter cover 25.

The one-way clutch 52 is a roller-type clutch, with springs 71 secured to the second portion 56 in pockets 74 formed in a ring 73 secured for rotation with the second portion 56. Each pocket 74 has a flat radial surface 76 and an inclined surface 78. Each spring 71 biases a roller 75 against the flat radial surface of the pocket 74. The rollers 75 are configured to be wedged between the flat radial surfaces 76 if the first portion 54 rotates faster than the second portion 56, transmitting tangential radial force to lock-up the portions 54, 56. However, if the second portion 56 rotates faster than the first portion 54, the rollers 75 roll within the pockets 74, to thereby allow free-wheeling action between the first portion 54 and the second portion 56.

Thus, if the rotational speed of the second portion 56, indicated by arrow S2 is greater than the rotational speed of the first portion 54, indicated by arrow S1, the one-way clutch 52 freewheels, such as when the engine 12 is running with the crankshaft 13 rotating at significant speed. However, if the rotational speed S1 of the first portion 54 is greater than the rotational speed S2 of the second portion 56 the one-way clutch 52 locks, causing the torque converter cover 25 to be driven by and rotate with the shell member 42. Accordingly, the starter motor 49 is operable to start the engine 12 by cranking the crankshaft 13 through the meshing pinion gear 46 and ring gear 44, the shell member 42, the locked one-way clutch 52 and the torque converter cover 25 and flex plate 27.

Figure 3:
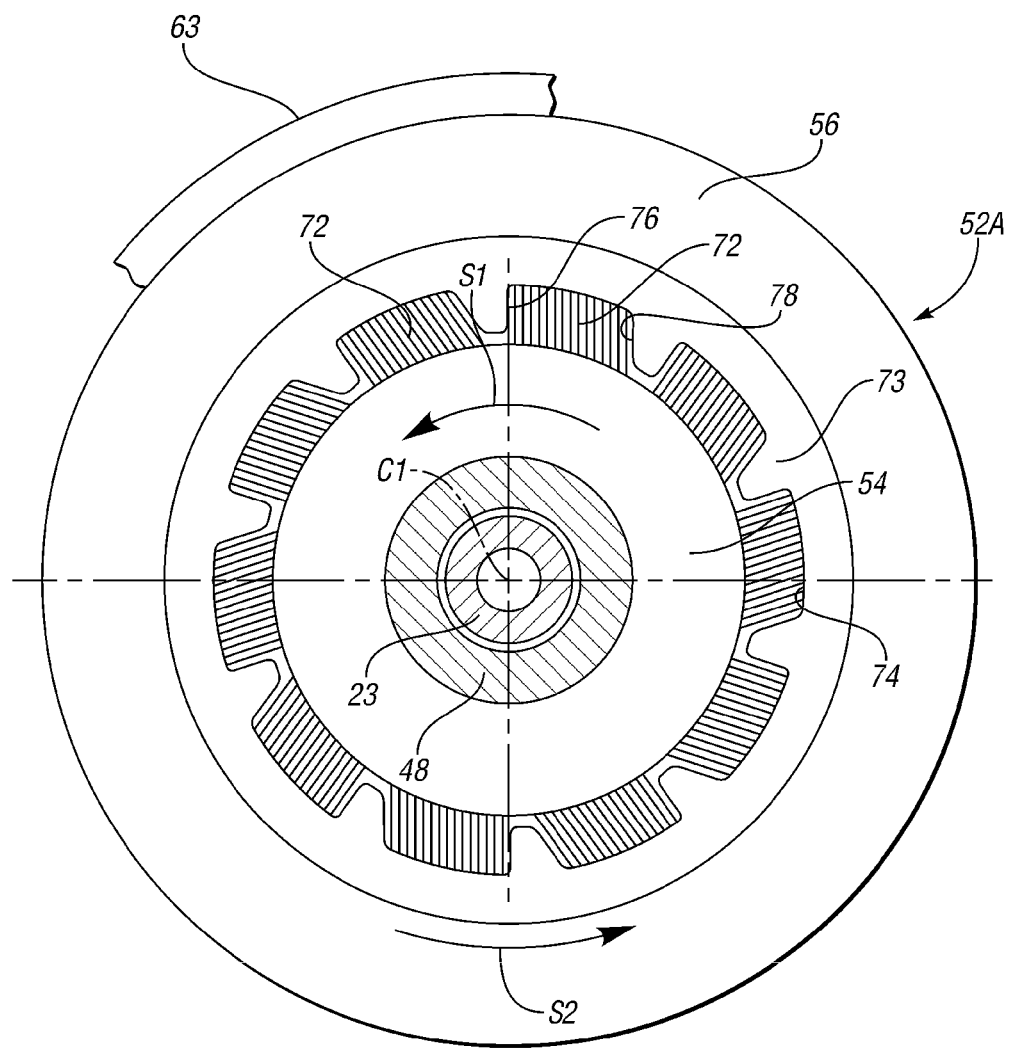
FIG. 3 is a schematic cross-sectional illustration of an alternative one-way clutch for the engine starting apparatus of FIG. 1.

Referring to FIG. 3, an alternative one-way clutch 52A uses sprag elements 72 secured to the first portion 54 and extending into the pockets 74. The sprag elements 72 are spring-like and are configured to collapse radially-inward when encountering a radially inward force provided when pressed against the inclined surfaces 78, to thereby allow free-wheeling action between the first portion 54 and the second portion 56. The sprag elements 72 lock against the flat radial surfaces 76 if the first portion 54 rotates faster than the second portion 56.

Because the pinion gear 46 need not be actuated to move axially, and is always in engagement with the ring gear 44, response time to start the engine 12 is minimal. Furthermore, because the pinion gear 46 need not first be moved into engagement with the ring gear 44 during a start event, there is no need to wait until rotation of the crankshaft 13 has stopped in order to power the starter motor 49 to transmit torque to torque converter cover 25 through the shell member 42 and one-way clutch 52. In a traditional starting system in which a starter ring gear is mounted to a flex plate, the ring gear, flex plate, and crankshaft must be stationary or at least synchronous with the pinion gear before the ring gear pinion gear can be moved into engagement with the ring gear to prevent noise of clashing gear teeth. Additionally, lubrication of the one-way clutch 52 (or alternative one-way clutch 52A) is provided with minimal additional components and machining operations and without adding to the axial length of the powertrain 10.

While the best modes for carrying out the invention have been described in detail, those familiar with the art to which this invention relates will recognize various alternative designs and embodiments for practicing the invention within the scope of the appended claims.

The invention claimed is:

1. A starting apparatus for cranking an engine crankshaft using a starter motor, wherein the engine is operatively connected to a transmission through a torque converter, comprising:
    a pinion gear connected for rotation with the starter motor;
    a torque converter cover operatively connected for rotation with the engine crankshaft;
    a shell member partially surrounding the torque converter cover;
    a ring gear connected to the shell member and in constant meshing relationship with the pinion gear such that the shell member is rotatably driven by the starter motor;
    a one-way clutch having a first portion connected for rotation with the shell member and a second portion connected for rotation with the torque converter cover;
    wherein the one-way clutch operatively engages the torque converter cover and the shell member for common rotation if the torque converter cover is not rotating faster than the shell member so that the starter motor drives the crankshaft, and is configured to overrun if the torque converter cover is rotating faster than the shell member when the engine is started.

2. The starting apparatus of claim 1, further comprising:
    a torque converter hub member extending from the torque converter cover; wherein the second portion of the one-way clutch is connected for rotation with the torque converter hub member radially outward thereof;
    a second hub member connected for rotation with the shell member; wherein the first portion of the one-way clutch is connected for rotation with the second hub member radially outward thereof and radially inward of the second portion of the one-way clutch;
    wherein the torque converter hub member has an aperture configured to communicate fluid from the transmission to the one-way clutch.

3. The starting apparatus of claim 2, further comprising:
    a sealing apparatus operatively connected with the second portion of the one-way clutch and configured to seal against the second hub member to contain the fluid from the transmission at the one-way clutch.

4. The starting apparatus of claim 2, wherein the torque converter cover partially defines a pump portion of the torque converter; wherein the one-way clutch is positioned generally radially inward of the pump portion and axially adjacent a stator portion of the torque converter.

5. The starting apparatus of claim 2, further comprising:
    a flex plate secured for rotation with the crankshaft and with the torque converter cover.

6. The starting apparatus of claim 1, further comprising:
    a torque converter hub member extending from the torque converter cover;
    a second hub member connected for rotation with the shell member; and
    a bushing in contact with and radially between the torque converter hub member and the second hub member.

7. A starting apparatus for rotatably driving an engine crankshaft of an engine connected with a transmission through a torque converter comprising:
    a starting motor with a pinion gear rotatably driven thereby;
    a torque converter cover connected for rotation with the engine crankshaft and piloted off of the engine crankshaft, and having a torque converter hub member extending generally axially opposite the torque converter from the crankshaft;
    a shell member piloted off of the torque converter hub member and configured to partially wrap around the torque converter;
    a ring gear secured to the shell member and in constant, nonselective meshing engagement with the pinion gear;
    a one-way clutch mounted to operatively engage the torque converter cover and the shell member for common rotation if the torque converter cover is not rotating faster than the shell member so that the starter motor drives the crankshaft, and configured to overrun if the torque converter cover is rotating faster than the shell member when the engine is started.

8. The starting apparatus of claim 7, wherein the one-way clutch is in fluid communication with the transmission such that transmission fluid lubricates the one-way clutch.

9. The starting apparatus of claim 8, further comprising:
    a sealing apparatus configured to seal between the one-way clutch and the shell member to contain the fluid from the transmission at the one-way clutch.

10. The starting apparatus of claim 7, further comprising:
    a flex plate secured for rotation with the crankshaft and with the torque converter cover; wherein the crankshaft drives the torque converter cover via the flex plate.

11. A starting apparatus for cranking an engine crankshaft using a starter motor, wherein the engine is operatively connected to a transmission through a torque converter, wherein the torque converter has a torque converter cover for a turbine portion with a torque converter hub member connected to the torque converter cover for driving a transmission pump, comprising:
    a one-way clutch having a first portion continuously operatively connected with the starter motor;
    wherein the one-way clutch has a second portion continuously connected for rotation with the torque converter hub member; wherein the torque converter hub member is configured to permit fluid from the transmission to lubricate the one-way clutch;
    wherein the one-way clutch is configured to operatively engage the starter motor and torque converter cover for common rotation if the second portion is not rotating faster than the first portion so that the starter motor drives the crankshaft, and configured to overrun if the second portion is rotating faster than the first portion when the engine is started.

12. The starting apparatus of claim 11, further comprising:
    a sealing apparatus configured to seal the transmission fluid provided through the torque converter hub member at the one-way clutch.

* * * * *